April 18, 1967 D. O. SCHMIDT ETAL 3,314,683
SEALING RING UNIT
Filed May 20, 1966
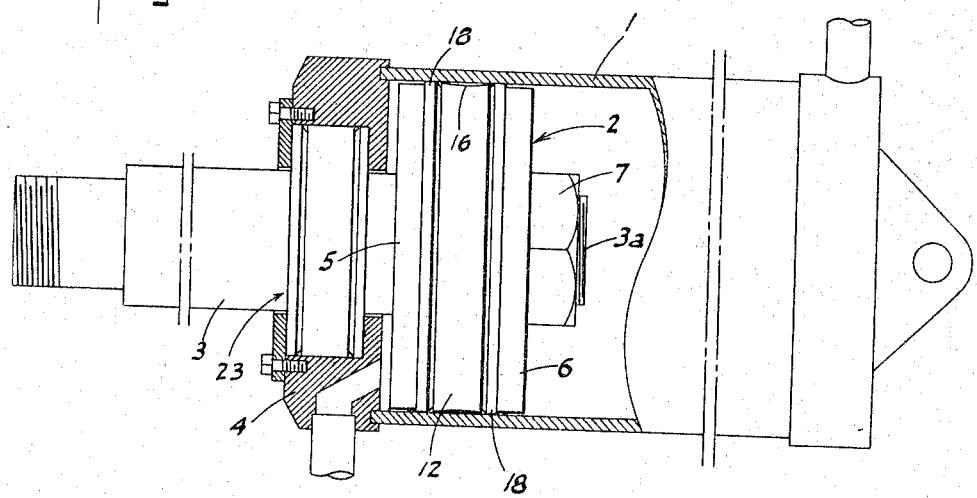
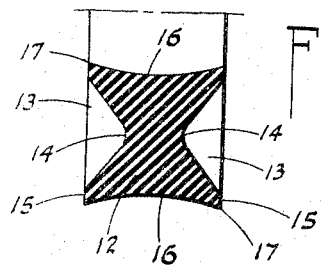
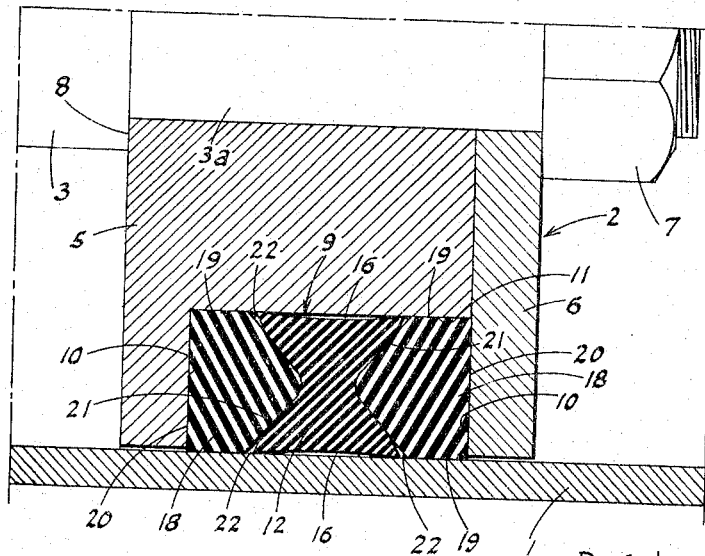
INVENTORS
Dagobert O. Schmidt
Albert E. Miller
BY *Webster & Webster*
ATTYS United States Patent Office 3,314,683
Patented Apr. 18, 1967

1

3,314,683
SEALING RING UNIT
Dagobert O. Schmidt, 825 S. Orange Ave., and Albert E. Miller, 413 E. Locust St., both of Lodi, Calif. 95240
Filed May 20, 1966, Ser. No. 551,800
1 Claim. (Cl. 277—188)

This invention relates to pistons and similar movable cylindrical members and the pressure sealing rings associated therewith, and particularly to a sealing ring unit primarily designed—but not limited—for mounting in the piston in a cylinder of a hydraulic or pneumatic ram or the like rather than in a high-temperature installation such as an internal combustion engine; the instant application being a continuation-in-part of application Ser. No. 272,758, filed Apr. 12, 1963.

The principal object of the invention is to provide a single endless or non-split sealing ring, of flexible and resilient material, adapted to be mounted in a piston having a peripheral groove or recess in which the ring is received; there being support rings disposed in the recess and engaging the sealing ring in a manner such that when pressure in the cylinder is exerted against the piston from either side thereof, the sealing ring will be deformed and pressed tightly against the wall of the cylinder throughout the full circumferential extent thereof, as well as against the bottom wall of the recess, so that pressure leakage past the piston is effectively prevented.

It is also an object of the invention to provide a sealing ring unit in which the support rings are arranged not only as side supports for the sealing ring, but as a means to maintain the piston in a centralized position in the cylinder.

A further object of the invention is to form the sealing ring in a manner such that when mounted in a piston and in position in a cylinder, said sealing ring presents scraping edges at its periphery which, when the piston is moving, prevent foreign matter entering between the sealing ring and the cylinder wall.

Another object of the invention is to provide a sealing ring unit which is equally efficient in both high and low pressure installations.

An additional object of the invention is to provide a sealing ring which has a low break-away point; i.e. only a low force is required to start the seal in motion in the cylinder—a feature which is especially desirable in a low pressure installation.

A further object of the invention is to provide a sealing ring unit which is designed for ease and economy of manufacture, and convenience of installation.

A still further object of the invention is to provide a practical, reliable, and durable sealing ring unit and one which is exceedingly effective for the purpose for which it is designed.

These objects are accomplished by means of such structure and relative arrangement of parts as will fully appear by a perusal of the following specification and claim.

In the drawings:

FIG. 1 is a side elevation of the improved sealing ring unit as applied to both the piston and piston rod of a hydraulic or pneumatic ram; the latter being shown partly in section.

FIG. 2 is a fragmentary enlarged radial section of the sealing ring unit and piston; the view showing the sealing ring as engaged with the cylinder wall.

FIG. 3 is a fragmentary enlarged radial section of the sealing ring, detached.

Referring now more particularly to the drawings and to the characters of reference marked thereon, the ram in which the sealing ring unit is here shown comprises a closed-end cylinder 1, a piston indicated generally at 2 slidable in the cylinder, and a piston rod 3 projecting from one end of the piston and slidable through an end head 4 of the cylinder.

2

Since the sealing ring unit hereinafter described is endless or unsplit, the piston 2 is made of two axially separate sections 5 and 6 which, when assembled with the piston rod 3, are rigidly secured against each other by means of a nut 7 on the inner end of the piston rod. The portion *3a* of the piston rod which projects through the piston is of reduced diameter, as shown, to provide a shoulder 8 for piston engagement at the end of the piston opposite the nut 7, see FIG. 2.

The piston 2 is formed about its periphery with a centrally located, relatively wide and deep recess or groove 9 of rectangular form in section; said recess thus having parallel side walls 10, and a bottom wall 11 parallel to the cylinder 1.

Seated in the recess 9 is an endless or unsplit sealing ring 12 of a material—such as rubber—having a flexible and resilient nature. It will be observed that while the sealing ring 12 is of substantially the same depth as the recess 9, said ring is materially narrower than said recess.

The sealing ring 12 is formed on each side with a relatively large annular V-shaped groove 13 having a rounded bottom surface 14; the width of these grooves at their outer edges being less than but approaching the radial width of said sealing ring. The side edges 15 of the ring are initially straight and parallel to each other as shown in FIG. 3.

The radially inner and outer faces of the sealing ring 12 are transversely concave as shown at 16; such curvature (when the ring is initially separate and non-deformed) extending the full width of the ring so as to corner-merge in sharp-edged relation with the side edges 15 of the ring as shown at 17 in FIG. 3.

Seated in the recess 9 on opposite sides of and cooperating with the sealing ring 12 are endless or unsplit support rings 18. These support rings are made of a suitable material (which is harder than that of the ring 12) such as hard, non-deformable rubber or plastic.

The radial width of the support rings 18 is substantially the same as the depth of the recess so that the radially inner and outer faces 19 of said support rings engage both the bottom wall 11 of the recess and the inner wall of cylinder 1 as shown. The support rings 18 are each formed with the outer side 20 (relative to sealing ring 12) flat or straight so as to flatly engage the related side wall 10 of the recess 9.

The inner side 21 of each support ring 18 is V-ridged with straight portions extending to a central apex whereby said support ring engages and fits in the related V-shaped groove 13 of the sealing ring 12. The straight portions of said sides 21, however, extend undeviatingly to a junction with the radially inner and outer faces 19 of the support rings whereby to leave V-shaped open spaces 22 in the recess 9 between the sides 21 of the support rings and the side edges 15 of the sealing ring.

The sealing ring 12 and support rings 18 are mounted in position before the piston sections 5 and 6 are assembled and secured together.

The initial radial extent of the sealing ring 12 in its greatest dimension between its radially inner and outer faces (which is between the related corners 17) is slightly greater than the radial distance from the bottom wall 11 of the recess 9 to the inner wall of cylinder 1. Additionally, the overall diameter of the sealing ring 12 is such that it has a very snug fit not only in the cylinder 1 but in the recess 9 as well.

As a result, when the sealing ring unit is in use on a piston in a cylinder, the radially inner and outer faces of the sealing ring 12 are spread somewhat and increase slightly in transverse width; this resulting in the concavity 16 of such faces becoming more shallow and in turn causing the corners 17 to project into the initially larger spaces 22. Upon such occurrence the side edges 15 related to each face of the sealing ring assume a sloping position in which they diverge toward said face, as shown in FIG. 2; the corners 17 then providing scraping edges.

The above described sealing ring unit functions in the following manner:

When pressure is applied to either side of the piston 2, such pressure passes by the adjacent portion of the piston and acts against the related support ring 18; the latter thus compressing the sealing ring 12 slightly in the direction of the pressure force. Upon such compression of the sealing ring 12, there is a tendency for the ring to expand radially and which forces the corners 17 and adjacent portions of the faces of said sealing ring tighter against the inner wall of cylinder 1 and the bottom 11 of the recess 9. In this manner a positive and effective seal is formed in the cylinder against pressure exerted from one end or the other of the piston.

The corners 17 which are opposite those against which pressure is applied act as scrapers or wipers and prevent access of foreign materials into the shallow concavity of the radially inner and outer faces of the sealing ring.

The shallow concavity in each of the radially inner and outer faces of the sealing ring provides a low pressure or vacuum area and which tends to further assure of a positive seal while permitting of free running of the sealing ring in the cylinder.

While here described as applied to a piston, the sealing ring unit may also be employed, with the necessary changes in size, to seal the piston rod beyond the cylinder and piston, as shown generally at 23.

From the foregoing description, it will be readily seen that there has been produced such a sealing ring unit as substantially fulfills the objects of the invention, as set forth herein.

While this specification sets forth in detail the present and preferred construction of the sealing ring unit, still in practice such deviations from such detail may be resorted to as do not form a departure from the spirit of the invention, as defined by the appended claim.

Having thus described the invention, the following is claimed as new and useful and upon which Letters Patent is desired:

A sealing ring unit for engagement between a member having a cylindrical surface and another member associated with the first member in concentric relation thereto, the members being disposed for relative longitudinal movement, said other member having a circumferential recess open to said cylindrical surface, and said recess being of rectangular form in section with the bottom wall of the recess parallel to said cylindrical surface; the sealing ring unit comprising an endless sealing ring of flexible and resilient material engaged under radial compression in and extending about the recess, the sealing ring at its radially inner and outer faces closely engaging the bottom wall of the recess and said cylindrical surface, respectively, the recess being materially wider than the sealing ring, said sealing ring being formed on each side with a relatively wide and deep annular V-shaped groove terminating at its side edges short of said faces of the ring, and support rings of a non-deformable material mounted in the recess between the sealing ring and the opposite sides of the recess and in contact with both said bottom wall of the recess and said cylindrical surface; said support rings following the contour of and closely engaging opposite surfaces of the sealing ring grooves throughout their extent and beyond said grooves extending without deviation to the radially inner and outer faces of said support rings in clearance relation to the sealing ring whereby to leave V-shaped spaces therebetween in the recess, the radially inner and outer faces of the sealing ring each having a shallow transverse concavity between the corners of such ring, and said faces being spread transversely and the corners of the sealing ring extending into the initially larger V-shaped spaces in the recess when the sealing ring is engaged between said bottom wall of the recess and said cylindrical surface, the related side edges of the sealing ring outwardly of the grooves then diverging toward said faces of the sealing ring.

References Cited by the Examiner

UNITED STATES PATENTS

| | | | |
|---|---|---|---|
| 2,841,429 | 7/1958 | McCuistion | 277—188 X |
| 2,934,363 | 4/1960 | Knox | 277—188 X |
| 3,068,054 | 11/1960 | Schmidt et al. | 277—188 |
| 3,187,645 | 6/1965 | Cope | 92—251 X |

SAMUEL ROTHBERG, *Primary Examiner.*